United States Patent [19]
Mori et al.

[11] Patent Number: 5,510,885
[45] Date of Patent: Apr. 23, 1996

[54] COLOR IMAGE FORMING APPARATUS

[75] Inventors: Hirotaka Mori; Ryo Ando, both of Kanagawa, Japan

[73] Assignee: Fuji Xerox Co., Ltd., Tokyo, Japan

[21] Appl. No.: 413,848

[22] Filed: Mar. 30, 1995

[30] Foreign Application Priority Data

May 16, 1994 [JP] Japan .................................. 6-101338

[51] Int. Cl.⁶ ............................................. G03G 15/01
[52] U.S. Cl. ..................... 355/271; 355/326 R; 347/116
[58] Field of Search ................................ 355/208, 271, 355/274, 326 R, 327; 347/116

[56] References Cited

U.S. PATENT DOCUMENTS 5,457,518  10/1995  Ashikaga et al. ..................... 355/208

FOREIGN PATENT DOCUMENTS 1-281468  11/1989  Japan .

Primary Examiner—Joan Pendegrass
Attorney, Agent, or Firm—Finnegan, Henderson, Farabow, Garrett & Dunner

[57] ABSTRACT

When a plural number of color out-of-registration detect patterns arrayed in the direction substantially orthogonal to the advancing direction of the endless image bearing member are sampled, the output signals of the line photosensing device are shading corrected. When a plural number of color out-of-registration detect patterns arrayed in the direction substantially parallel to the advancing direction of the endless image bearing member are sampled, a control means controls a shading correction means so as to perform the shading correction of the output signals of the line photosensing device.

9 Claims, 15 Drawing Sheets

COLOR IMAGE FORMING APPARATUS

BACKGROUND OF THE INVENTION

The present invention relates to a method of sampling color out-of-registration detect patterns formed on a rotating, endless image bearing member in a color image forming apparatus, such as a digital color copying machine or a digital color printer, which forms, for color image formation, a plural number of toner images of different colors on an image transfer member placed on the endless image bearing member or directly on the endless image bearing member.

Color documents are rapidly superseding black and white documents in recent offices. With this trend, image forming machines handling these documents, such as copying machines, facsimile machines, and printers, are also superseded by color image forming machines. Further, high image quality and high operating speed are required for recent document processings in recent office works. To satisfy the requirements, the related machines producing high quality pictures at high speed are proposed and developed. One of such machines is provided with three image forming units for black (K), yellow (Y)., magenta (M), and cyan (C). Color images formed by those units are transported, in a superimposed fashion, on a transfer member or a medium transfer member being transported. This machine is of the so-called tandem type.

A specific example of the color image forming apparatus of the tandem type follows. As shown, the color image forming apparatus includes four image forming units; a black image forming unit 100K for forming a black (K) image, a yellow image forming unit 100Y for forming a yellow (Y) image, a magenta image forming unit 100M for forming a magenta (M) image, and a cyan image forming unit 100C for forming a cyan (C) image. These image forming units 100K, 100Y, 100M, and 100C are horizontally disposed at fixed intervals. An endless transfer belt 102 is disposed under the image forming units 100K, 100Y, 100M, and 100C of four colors, black, yellow, magenta and cyan. The endless transfer belt 102 transports a transport paper 101 through the image transfer positions of those image forming units, while electrostatically attracting it thereonto. The endless transfer belt 102 is made of flexible synthetic resin, such as PET.

The four image forming units 100K, 100Y, 100M and 100C of black, yellow, magenta, and cyan have substantially the same constructions. Those units form toner images of black, yellow, magenta, and cyan in successive manner. The units are each provided with a photoreceptor drum 103. The surface of the photoreceptor drum 103 is uniformly charged by a scorotron 104 for primary charging. Then, the surface of the photoreceptor is exposed to a laser beam 105 for image formation, which repeatedly scans across the surface thereof in accordance with image information. As a result, a latent electrostatic image is formed on the surface of the photoreceptor. The latent electrostatic images thus formed on the photoreceptor drum 103 are developed into visual color images by toner of black, yellow, magenta, and cyan. These visual color images are subjected to a before-transfer charging process by a before-transfer charger 107, and successively transferred onto the transport paper 101 held on the endless transfer belt 102. The transport paper 101 having color toner images of black, yellow, magenta, and cyan transferred thereonto is separated from the endless transfer belt 102, and subjected to a fixing process by a fixing unit, not shown). In this way, a color image is formed.

In the figure, reference numeral 109 designates a photoreceptor cleaner; 110, a photoreceptor discharging lamp; 111, a paper detach corotron; 112, a transfer belt discharging corotron; 113, a transfer belt cleaner; and 114, a pre cleaning corotron.

In the thus constructed color image forming apparatus of the tandem type, a plural number of image forming units are used for forming one color image. Because of this construction, the color forming speed may be increased to some extent. However, the apparatus suffers from such a problem that where the color forming speed is increased, relative positioning of the color images formed by the image forming units, viz., a color registration, is frequently deteriorated and the picture quality of the resultant color image is also deteriorated. In this respect, it is technically difficult to improve both the picture quality and the image forming speed. This problem arises from the fact that a variation of temperature, within the apparatus and/or application of an external force to the apparatus causes the positions and the size of the image forming units per se, and the component parts of the units to displace. The temperature variation and the application of the external force inevitably take place. In ordinary works for the image forming apparatus, such as removal of paper jamming, parts exchange in maintenance, or movement of the color image forming apparatus, an external force is inevitably applied to the apparatus.

Published Unexamined Japanese Patent Application No. Hei. 1-281468 discloses another color image forming apparatus. The apparatus is constructed with a plural number of image forming sections for forming visual images representative of image information on an original document, and additionally other visual images of position marks for position detection, a moving member which moves along image transfer ares where the visual images of original image information formed by the image forming sections and the visual images of the position marks are transferred, and mark detecting means for detecting the position marks transferred on the moving member, the mark detecting means being located downstream of the moving member in the image transfer areas when viewed in the direction of the movement of the moving member. The thus constructed color image forming apparatus controls the image forming sections so as to correct out-of-registration of the transferred images in accordance with detect signals output from the mark detecting means.

An example of the technique for correcting the out-of-registration of the transferred images, when applied to the tandem type color image forming apparatus shown in FIG. 17, is illustrated in FIG. 18. As shown, color out-of-registration detect patterns 120K, 120Y, 120M and 120C, and 121K, 121Y, 121M and 121C are arrayed at proper spatial intervals in the advancing direction of the endless transfer belt 102 and in the direction orthogonal to the belt advancing direction. A light emitting element 123 illuminates these patterns 120K, 120Y, 120M and 120C, and 121K, 121Y, 121M and 121C from the underside of the patterns in the illustrated example. A line photosensing device 122, located above the patterns, samples the patterns by using light transmitted through the transfer belt. The line photosensing device 122 may be a CCD sensor containing a number of photosensing picture elements linearly arrayed. Distances each between the adjacent patterns of those patterns 120K, 120Y, 120M and 120C, and 121K, 121Y, 121M and 121C are computed. The positions of the image forming units 100K, 100Y, 100M and 100C and the image forming timings are adjusted so that the computed distances are equal to the corresponding reference values. In this way, the picture quality of the resultant picture is improved.

In the color image forming apparatus thus constructed, the color out-of-registration detect patterns 120K, 120Y, 120M and 120C, and 121K, 121Y, 121M and 121C are formed by the image forming units 100K, 100Y, 100M and 100C. Those patterns are detected by the line photosensing device 122, such as a CCD sensor. The distances each between the adjacent patterns of those patterns 120K, 120Y, 120M and 120C, and 121K, 121Y, 121M and 121C are computed. The positions of the image forming units 100K, 100Y, 100M and 100C and the image forming timings are adjusted so that the computed distances are equal to the corresponding reference values. In this way, a high picture quality of the resultant picture is realized.

When a CCD sensor 122 as a line photosensor is used for detecting the color out-of-registration, the sensitivities of the photosensing picture elements linearly arrayed are not uniform as shown in FIG. 19. Accordingly, when the positions of the patterns 120K, 120Y, 120M and 120C, and 121K, 121Y, 121M and 121C are detected by the line photosensing device 122, the detection results suffer from detection errors because of the different sensitivities of the photosensing picture elements.

Unexamined Japanese Patent Publication No. Hei. 6253, 151, filed by the applicant of the present Patent Application, proposes a unique technique for removing the detection errors. The technique applies a shading correction to the output signals of the CCD sensor 122 for removing the detection errors when the positions of the patterns 120K, 120Y, 120M and 120C, and 121K, 121Y, 121M and 121C are detected. In the shading correction, the photosensing picture elements of the CCD sensor 122 are illuminated with light at a fixed light intensity. The signals output from those picture elements are corrected so as to be uniform in value by a computing processing by a CPU, for example.

However, the conventional art has the following problem. In the conventional art, as described above, the shading correction process is applied to the output signals of the picture elements of the CCD sensor 122, in order to prevent the detection error that will be caused when the CCD sensor 122 as a line photosensing device detects the positions of the color out-of-registration detect patterns 120K, 120Y, 120M and 120C, and 121K, 121Y, 121M and 121C. Use of the shading correction process improves the position detection accuracy of the out-of-registration detect patterns, but increases a load to the CPU when it operates for computating. As a result, the hardware and the software to cope this increased load to the CPU are large in construction, leading to the increase of cost to manufacture.

In the attempt of realizing the shading correction process without increasing the hardware and the software, time taken for the shading correction process is long, and it is impossible to reduce the sampling period in the sampling of the color out-of-registration detect patterns 120K, 120Y, 120M and 120C, and 121K, 121Y, 121M and 121C. For this reason, the sampling period must be set long to some extent. Under this condition, the AC components of the signals representative of the out-of-registration of the image forming positions of the respective colors that are detected on the basis of the results of the sampling of the patterns 120K, 120Y, 120M and 120C, and 121K, 121Y, 121M and 121C are limited to those of low frequencies. As a result, the detection error of the DC component which indicate overall out-of-registration of those color image forming positions frequently takes place, as shown in FIG. 20. In the conventional art, the results of the sampling of the color out-of-registration detect patterns 120K, 120Y, 120M and 120C, and 121K, 121Y, 121M and 121C, which greatly contain the DC component detection errors, are used for correcting the DC color out-of-registration components by controlling the image forming timings in the black image forming units 100K, 100Y, 100M, and 100C. This fact leads to deterioration of the shading correction accuracy. On the other hand, where the sampling period of sampling the patterns 120K, 120Y, 120M and 120C is short, the DC component detection error is little caused as shown in FIG. 21.

SUMMARY OF THE INVENTION

Accordingly, an object of the present invention is to provide a color image forming apparatus which forms, for color image formation, a plural number of toner images of different colors on an image transfer member placed on the endless image-bearing member or directly on the endless image-bearing member, the apparatus being capable of accurately sampling the color out-of-registration detect patterns without greatly increasing the hardware and software construction, and improving the accuracy of correcting the color out-of-registration.

A plural number of color out-of-registration detect patterns arrayed in the direction (fast scan direction) substantially orthogonal to the advancing direction of an endless image bearing member are used for detecting out-of-registration of the image forming positions in the slow scan direction, and color out-of-registration, such as skew component, in the advancing direction (slow scan direction) of the endless image bearing member. A plural number of color out-of-registration detect patterns arrayed in the advancing direction (slow scan direction) of the endless image bearing member are used for detecting out-of-registration of the image forming positions in the fast scan direction, and color out-of-registration, such as image forming magnification difference, in the direction (fast scan direction) substantially orthogonal to the advancing direction of the endless image bearing member. Since the latter patterns are for detecting the image forming positions in the scan direction of the line photosensing device as color out-of-registration detect patterns detecting means, the results of the position detection are greatly influenced by a variation of sensitivities of the picture elements contained in the line photosensing device. In detecting the latter patterns, or the color out-of-registration detect patterns arrayed in the advancing direction (slow scan direction) of the endless image bearing member, the detected signals are shading corrected before their processing.

The former patterns, or the color out-of-registration detect patterns arrayed in the direction substantially orthogonal to the advancing direction of the endless image bearing member, are usually for the drive direction of a mechanical system for driving the endless image bearing member, the photoreceptor drum, and the like. Therefore, in the former patterns the frequency of an AC component to be detected is higher than that in the latter patterns. In other words, the sampling frequency when the color out-of-registration detect patterns are sampled is higher. How to simplify the sampling of the former patterns is a key point in the system simplification.

When the former patterns, or the color out-of-registration detect patterns arrayed in the direction (fast scan direction) substantially orthogonal to the advancing direction of the endless image bearing member are detected by the line photosensing device, if the detected signals are not shading corrected, the positions of the centroid and the peaks of the color out-of-registration detect patterns can be detected free from errors, even under the condition that the sensitivities of the picture elements of the line photosensing device are not uniform, since the color out-of-registration detect patterns arrayed in the direction substantially parallel to the fast scan direction are moved across the line photosensing device, with the movement of the endless image bearing member. When the color out-of-registration detect patterns arrayed in the direction substantially parallel to the fast scan direction are detected by the line photosensing device, the resultant detection profile varies with the sensitivities of the individual picture elements of the line photosensing device if the shading correction is not executed. Nevertheless, the centroid and the peak positions of the detection profile do not vary with the different sensitivities of the individual picture elements of the line photosensing device. Therefore, in detecting the former patterns, or the color out-of-registration detect patterns arrayed in the direction (fast scan direction) substantially orthogonal to the advancing direction of the endless image bearing member, the detection accuracy is little deteriorated if the shading correction is not carried out.

The endless image bearing member made of synthetic resin may be an image transfer belt, for example. It may also be any of a transfer drum with a synthetic resin film put thereon, a medium transfer member shaped like a belt, and a photoreceptor shaped like a belt.

A detecting device of the transmission type is used for the detecting means for detecting the color out-of-registration detect patterns formed on the endless image bearing member. A detecting device of the reflection type may also be used for the same, as a matter of course. In this case, a line CCD, for example, is used for a detecting element of the detecting means.

In the color image forming apparatus of the present invention, in the case of sampling a plural number of the color out-of-registration detect patterns arrayed in the direction orthogonal to the advancing direction of the endless image bearing member, the shading correction process for the output signals of the line photosensing device is not carried out. In the case of sampling a plural number of the color out-of-registration detect patterns arrayed in the advancing direction of the endless image bearing member, the shading correction process for the output signals of the line photosensing device is carried out. Accordingly, when the plural number of the color out-of-registration detect patterns arrayed in the direction substantially orthogonal to the advancing direction of the endless image bearing member, are sampled, the shading correction process for the output signals of the line photosensing device is not carried out. Therefore, the sampling period of the color out-of-registration detect patterns arrayed in the direction substantially orthogonal to the advancing direction of the endless image bearing member may be reduced without greatly increasing the hardware and software construction, and the cost to manufacture. The color out-of-registration detect patterns are accurately sampled. Thus, there is provided a method of sampling the color out-of-registration detect patterns in a color image forming apparatus, which is improved in the accuracy of detecting the color out-of-registration, such as DC component.

When the color out-of-registration detect patterns arrayed in the direction substantially orthogonal to the advancing direction of the endless image bearing member, the resultant detection profile varies with the sensitivities of the individual picture elements of the line photosensing device if the shading correction is not executed. Nevertheless, the centroid and the peak positions of the detection profile do not vary with the different sensitivities of the individual picture elements of the line photosensing device. Therefore, in detecting the former patterns, or the color out-of-registration detect patterns arrayed in the direction (fast scan direction) substantially orthogonal to the advancing direction of the endless image bearing member, the detection accuracy is little deteriorated if the shading correction is not carried out.

DETAILED DESCRIPTION OF THE PREFERRED EMBODIMENTS

The present invention will be described in detail with reference to the accompanying drawings.

Figure 1A:
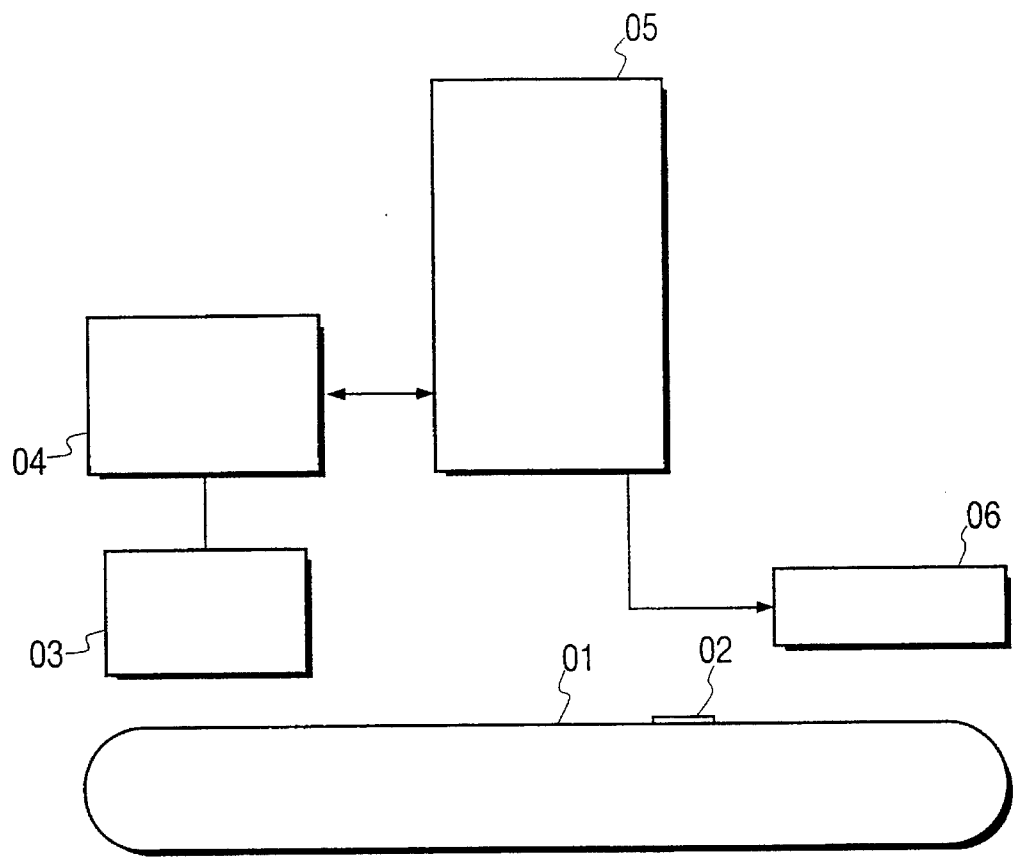
FIGS. 1(a) and 1(b) are diagrams showing the concept of a color image forming apparatus according to the present invention.
Figure 1B:
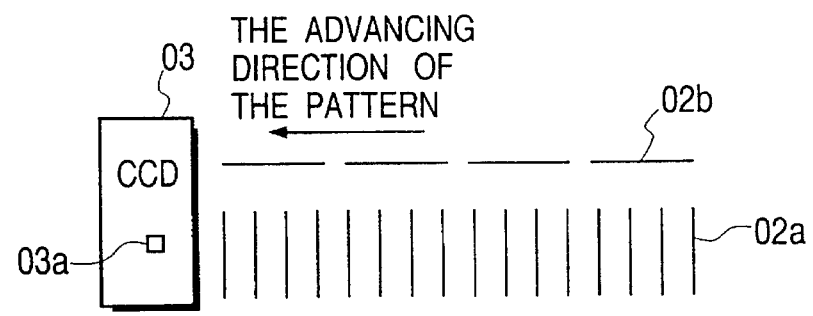
Figure 2:
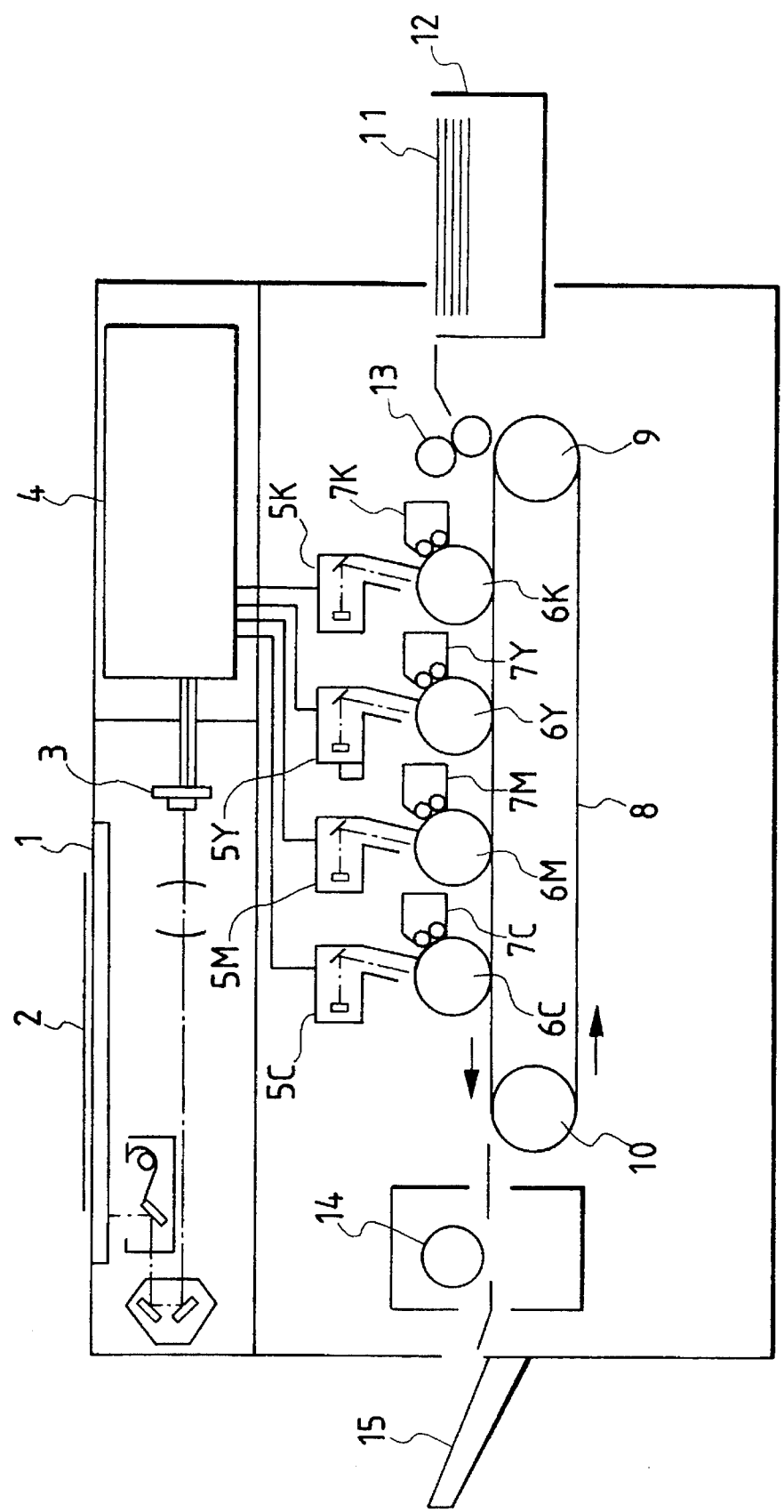
FIG. 2 is a view showing the construction of a digital color copying machine according to an embodiment of the present invention.

FIG. 2 is a view showing an overall construction of a digital color copying machine which is a specific form of a color image forming apparatus according to an embodiment of the present invention.

In FIG. 2, an image on an original document 2, located on a platen glass 1, is read by an image scanner with a color CCD sensor 3, through an optical scan system including a light source, a scan mirror, and the like. The color CCD sensor 3 then produces analog color image signals of R, G and B. The analog image signals outputted from the color CCD sensor 3 are inputted to an image processing unit 4 where these color signals are converted into image signals of K, Y, M and C. These converted image signals are temporarily stored in a memory contained in the image processing unit 4.

From the image processing unit 4, the color image data of those colors are successively outputted to the laser beam scanning devices 5K, 5Y, 5M and 5C of image forming units 21K, 21Y, 21M and 21C of K (black), Y (yellow), M (magenta) and C (cyan). Latent electrostatic images are formed on photoreceptor drums 6K, 6Y, 6M and 6C by the laser beam scanning devices 5K, 5Y, 5M and 5C, respectively. The latent electrostatic images formed on the photoreceptor drums 6K, 6Y, 6M and 6C are developed, by developing units 7K, 7Y, 7M and 7C, into color toner images of K (black), Y (yellow), M (magenta) and C (cyan).

A recording paper 11, used for recording the color toner images of K, Y, M and C thereon, is supplied from a paper cassette 12. The paper 11 supplied from the paper cassette 12 is fed onto an image transfer/transport belt 8 by a transporting roller 13, which is driven for turn at a preset timing. The image transfer/transport belt 8 is stretched between a drive roller 9 and a follower roller 10 at a given tension in an endless fashion. It is circulated at a fixed speed in the direction of an arrow by the drive roller 9 having an excellent constancy of motor speed, exclusively used for the driving of the image transfer/transport means belt.

The paper transport timing and the image write timing are selected such that the leading edge of the recording paper 11 transported by the recording paper 11 coincides with the leading edge of the image that is formed on the first photoreceptor drum 6K by the image forming unit at an image transfer point as the lowest point of the photoreceptor drum 6K. When the recording paper 11 reaches the image transfer point, a visual image is transferred from the photoreceptor drum 6K onto the recording paper 11 by a transfer corotron, not shown, and then reaches right under the photoreceptor drum 6Y. Right under the photoreceptor drum 6Y, a visual image is transferred from the photoreceptor drum 6Y onto the recording paper 11 as under the photoreceptor drum 6K. The recording paper 11 having all the visual images transferred thereon is transported by the image transfer/transport belt 8. When it approximates to the follower roller 10, it is peeled off the image transfer/transport belt 8 by a coroton for separating the recording paper 11 from the image transfer/transport belt 8, a stripper, or another suitable means. Thereafter, the toner images of four colors, which are transferred onto the recording paper 11, are fixed onto the recording paper 11 by a fixing unit 14, and then the recording paper 11 having the color image is discharged into an exit tray 15. In this way, a color image is copied.

Figure 3:
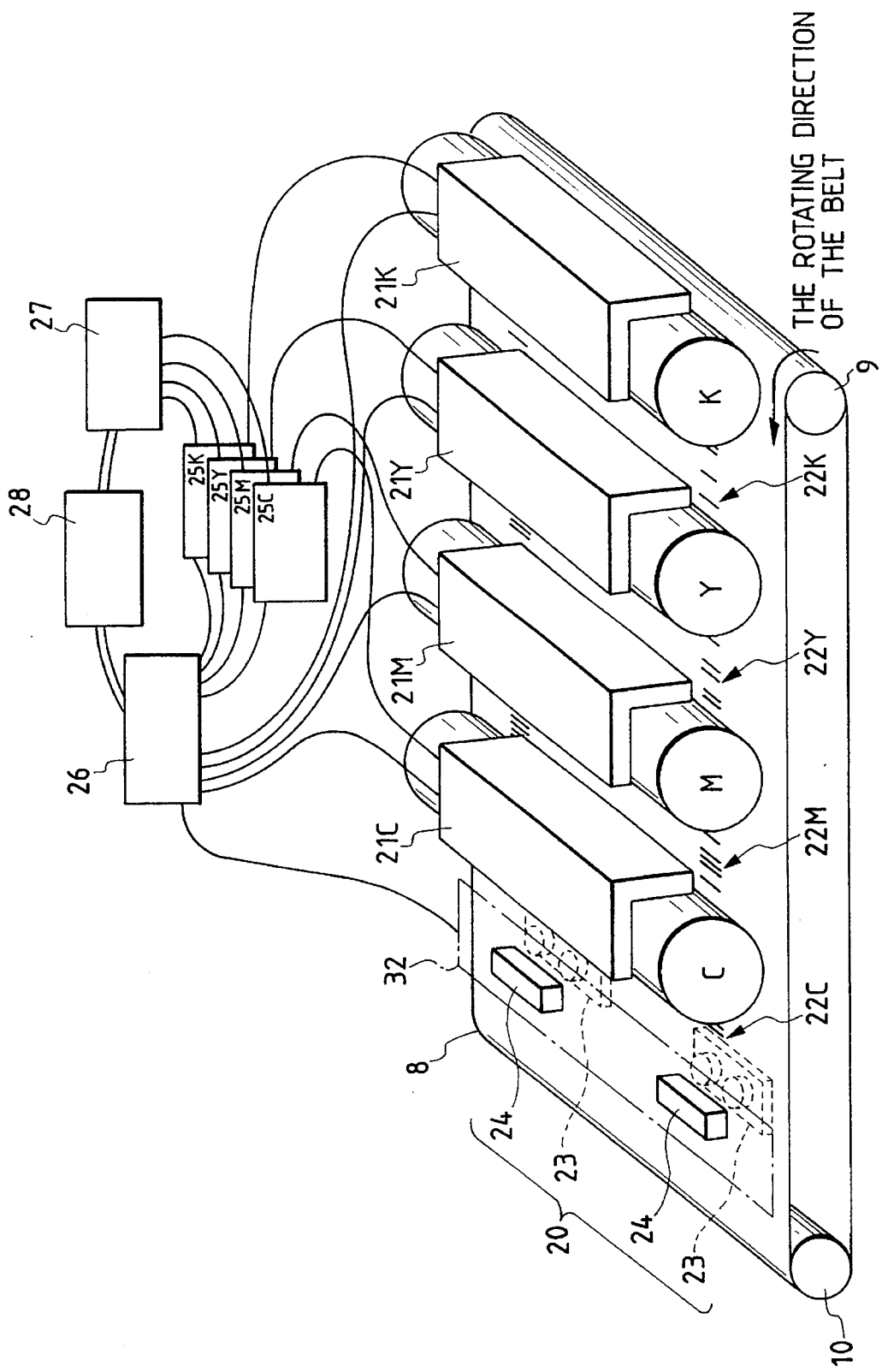
FIG. 3 is a perspective view showing of a key portion of the digital color copying machine of FIG. 2.

FIG. 3 is a view schematically showing a digital color printer of the multi-transfer type incorporating the method of sampling the color out-of-registration detect patterns.

Reference numeral 20 designates detecting means for detecting images of color out-of-registration detect patterns, which are formed on the image transfer/transport belt 8 by the image forming units 21K, 21Y, 21M and 21C. The pattern detecting means 20 includes a set of a light source 23 and a photosensing device 24, which is disposed on one side of the image area of the image transfer/transport belt 8 when seen in the width direction of the image transfer/transport belt 8, and another set of a light source 23 and a photosensing device 24 is disposed on the other side of the image area. The light source 23 comprising an LED for providing back light necessary for detecting the images of the color out-of-registration detect patterns on the image transfer/transport belt 8. The photosensing device 24, which is disposed in opposition to the light source 23 with respect to the image transfer/transport belt 8, is a CCD sensor as a line photosensing device comprising a number of photosensing picture elements linearly arrayed.

Interface boards 25K, 25Y, 25M and 25C, respectively, send image signals to the laser beam scanning devices in the image forming units 21K, 21Y, 21M and 21C. A correction board 26 controls an overall color out-of-registration correction system. An image processing board 27 contains all of a memory, and an image processing unit and its related circuitry. A control board 28 controls all of these boards and the operation of the digital color copying machine.

Figure 4:
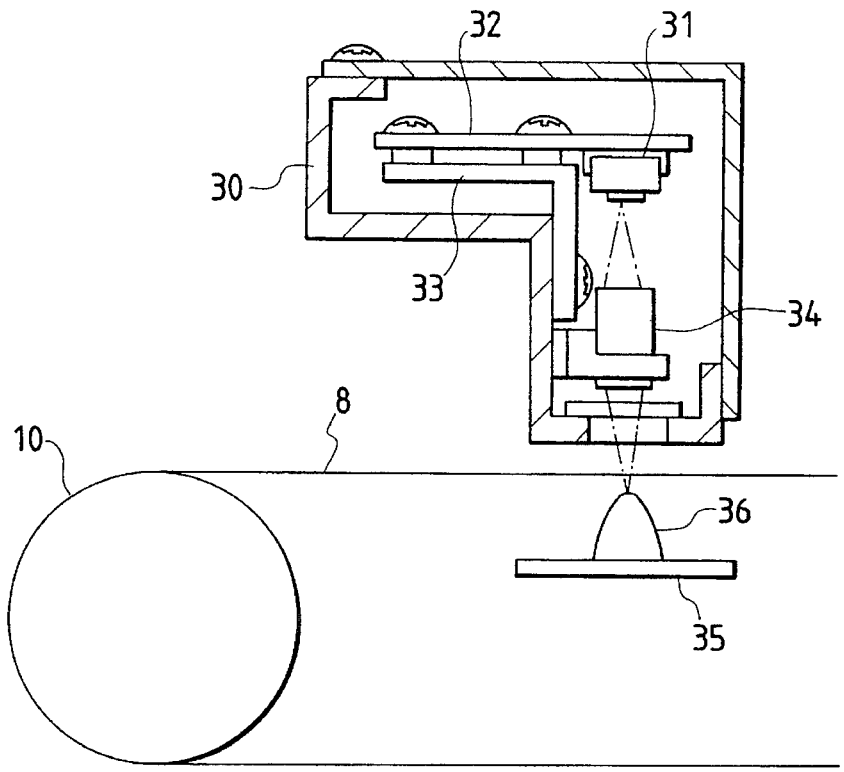
FIG. 4 is a view showing a sensor.

FIG. 4 is a cross sectional view showing the pattern detecting means for detecting color out-of-registration detect patterns.

In the figure, reference numeral 30 designates a housing of the pattern detecting means; 31, a linear CCD as the photosensing device 24; and 32, a board having the linear CCD 31 and a peripheral circuit for driving the CCD, which are mounted thereon. The board 32 is mounted on an angle 33, shaped like L in cross section, which is mounted on the housing 30. Reference numeral 34 designates a distributed index lens array; 35, a board having an illumination source 36 as the photosensing device 24 and its peripheral circuitry, which are mounted thereon.

Figure 5:
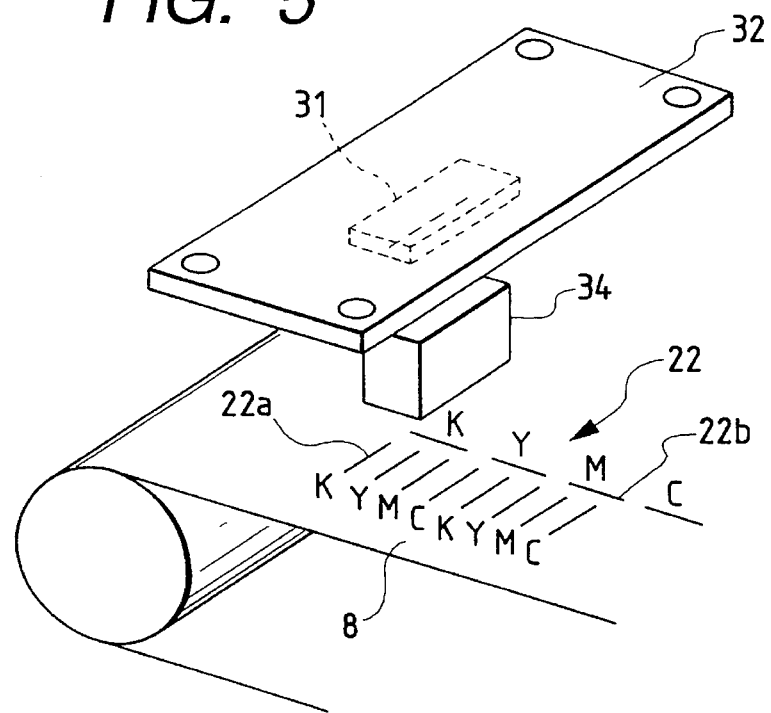
FIG. 5 is a perspective view showing the sensor of FIG. 4.

FIG. 5 three-dimensionally illustrates positional relationships among the sensor board 32, the distributed index lens array 34, an image-position detect pattern image 22 on the image transfer/transport belt 8. Two sets of the sensor board 32 and the distributed index lens array 34 are disposed within the housing 30. Additionally, two housings 30 are disposed on both sides of the image area of the image transfer/transport belt 8 when seen in the width direction of the image transfer/transport belt 8, one for one side of the image area and the other for the other side. The linear CCD 31 mounted on one of the sensor boards 32 is provide for detecting the image-position detect pattern image 22 located on this side in both the fast and slow scan directions. The linear CCD 31 mounted on the other sensor board 32 is for detecting the image-position detect pattern image 22 located on the inner side. With use of two sensors, the adjustment for the out-of-registrations of the color images in the central portion of the image to be copied in both the fast and slow directions, lateral magnification errors, and angular shift in the fast scan direction can be made. A single detect sensor may be used where the adjustments for the correction of the out-of-registration are required only in the fast scan direction. The housings 30 each containing two detect sensors, as shown in FIG. 3, are located at both the ends of the image area on the image transfer/transport belt 8 as viewed in the width direction of the belt.

The illumination source 36 comprising an LED. If a wider area is to be illuminated, two or more LEDs may be used. A single LED is used when the out-of-registrations of the color images as viewed in the fast scan direction and in the image-transfer/transport direction, i.e., the slow scan direction, are detected at the scan start position of the laser beam scanning device, viz., relatively closer positions. Two LEDs are used when the out-of-registrations are detected at relatively separated positions. In this case, the illumination width substantially equal to the configuration of the LED can be gained by locating the LED 36 of the condensing type close to the image transfer/transport belt 8. Power consumption is small since only several LEDs are lit on.

Figure 6:
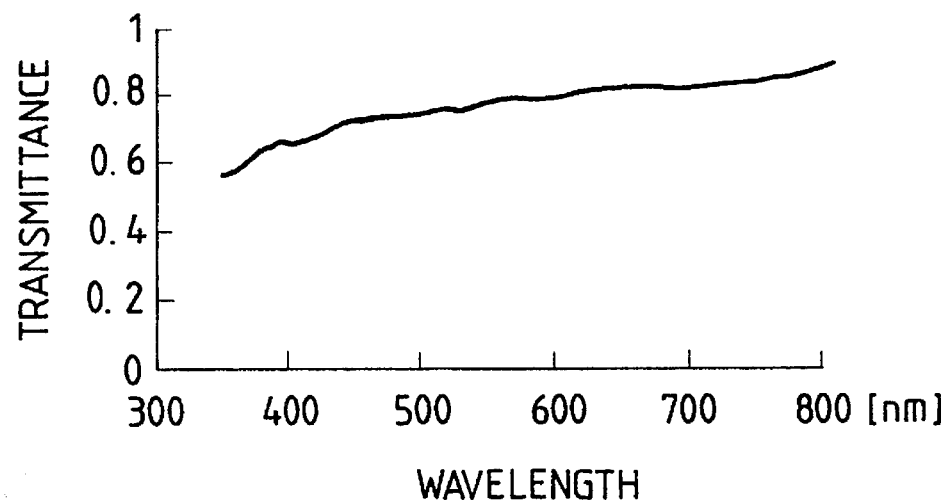
FIG. 6 is a graph showing the relationship between transmittance and wave length.
Figure 7:
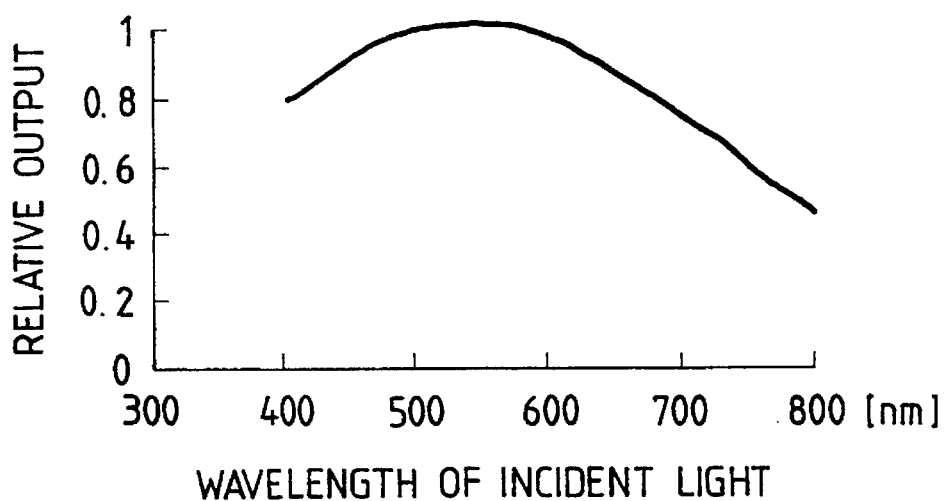
FIG. 7 is a graph showing the relationship between relative output and wave length of incident light.
Figure 15:
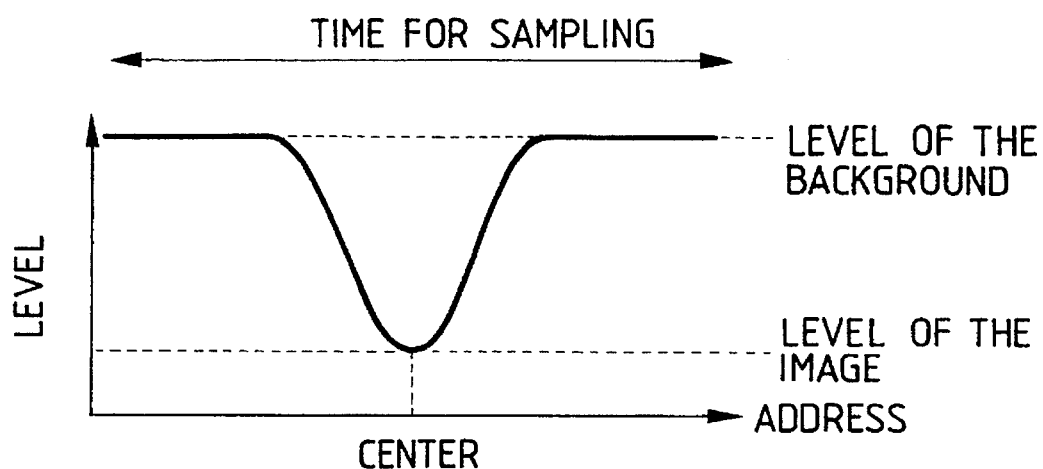
FIG. 15 is a graph showing a variation of the output level of the sensor.
Figure 16:
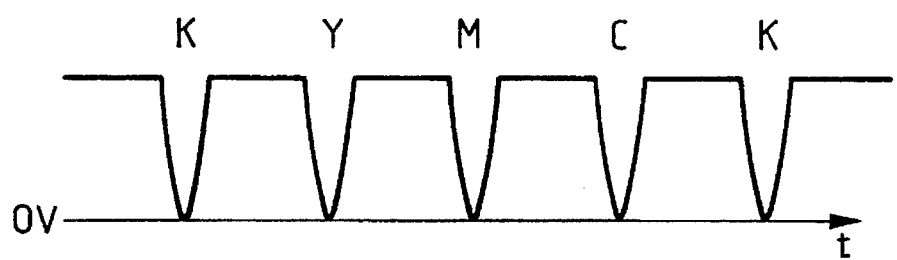
FIG. 16 is a graph showing a variation of the output level of the sensor.
Figure 17:
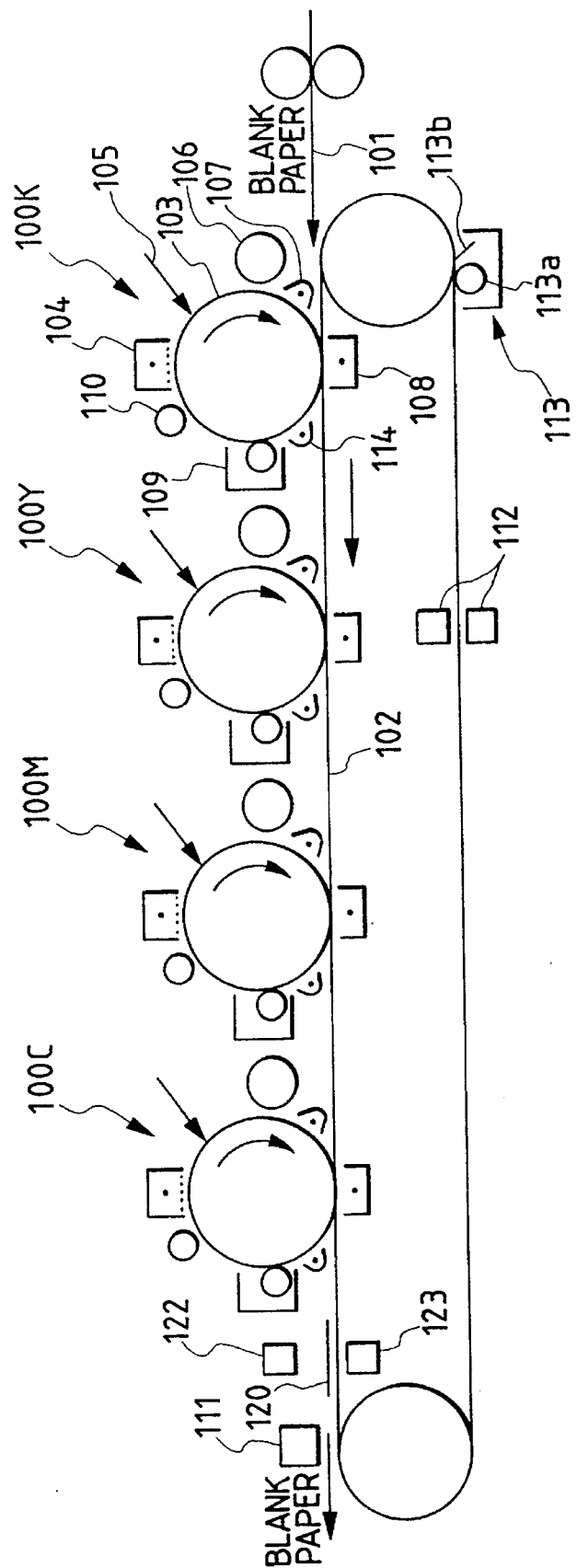
FIG. 17 is a view showing the construction of a conventional digital color copying machine.
Figure 18:
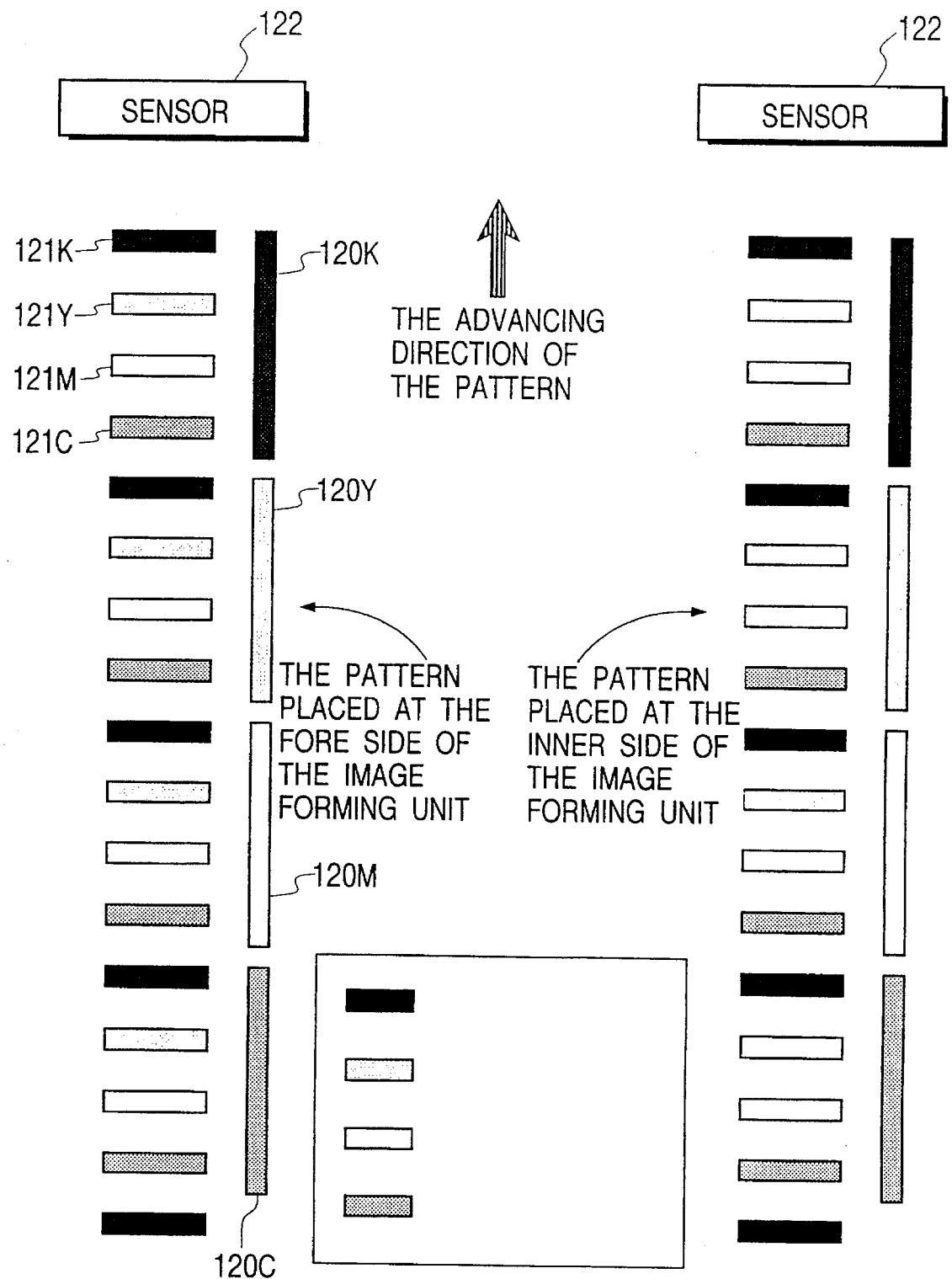
FIG. 18 is an explanatory diagram showing color out-of-registration detect patterns.

In the present embodiment, a transparent belt 8 made of PET (polyethylene terephthalate) is used for the image-transfer/transport means. In this case, a typical transmittance characteristic of the PET belt is illustrated in FIG. 6. As shown, the transmittance increases as the wave length increases. A typical sensitivity characteristic of the linear CCD 31 is illustrated in FIG. 7. As seen, it has a good sensitivity in the region of visible rays of light. Wave lengths of light emitted from an LED 36 of high luminance are present in a red region (600 to 700 nm). When these LEDs are combined, a large sensor output can be produced. When the pattern image 22 on the image transfer/transport belt 8 reaches the sensing position, the sensor output is extremely small. The reason for this is that the transmittance of the pattern image 22 is approximately 0 at the position of the pattern since the toner of the pattern image 22 is opaque irrespective of its colors. As the sensor output difference is larger, the out-of-registration of the color images is more stably detected. An example of the sensor output in this instance is shown in FIGS. 15 and 16. As seen, the sensor output signals of the colors of K, Y, M and C are substantially equal.

Figure 12:
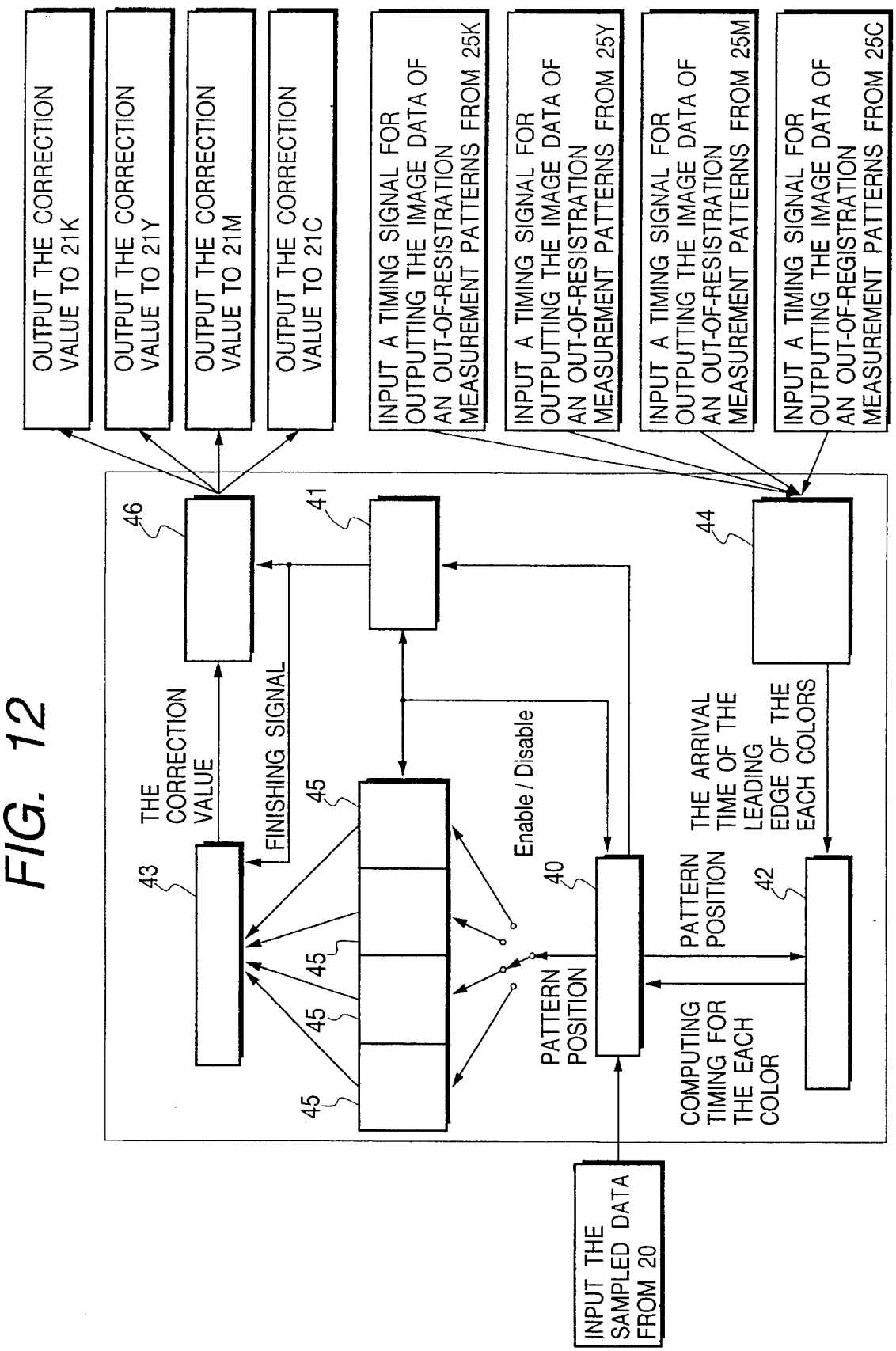
FIG. 12 is a block diagram showing a control circuit for a digital copying machine incorporating a method of sampling color out-of-registration detect patterns according to the present invention.

FIG. 12 is a block diagram showing a control unit for executing the method of sampling color out-of-registration detect patterns according to the present invention. The control section is contained in the correction board 26 shown in FIG. 6.

In the figure, reference numeral 40 designates a pattern position computing means; 41, a computed value count means; 42, a computating-operation timing generating means; 43, a color out-of-registration computing means; 44, an arrival time computing means for computing the arrival time of the leading edge of each pattern for out-of-registration measurement; 45K, 45Y, 45M and 45C, pattern position memories of the respective colors; and 46, a correction value computing means for the image forming units.

In the case of sampling a plural number of the color out-of-registration detect patterns arrayed in the direction substantially orthogonal to the advancing direction of the endless image-bearing member, the shading correction process for the output signals of the line photosensing devices is not carried out. In the case of sampling a plural number of the color out-of-registration detect patterns arrayed in the direction substantially in parallel with the advancing direction of the endless image-bearing member, the shading correction process for the output signals of the line photosensing devices is carried out.

Figure 19:
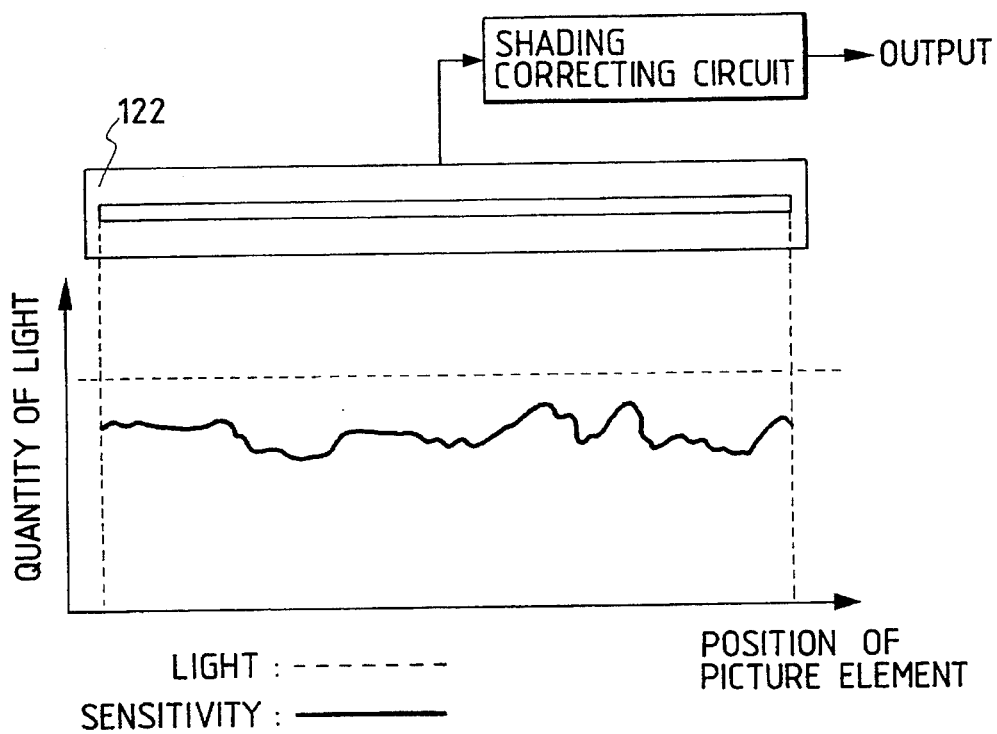
FIG. 19 is an explanatory diagram showing the shading correction in the line CCD.
Figure 20:
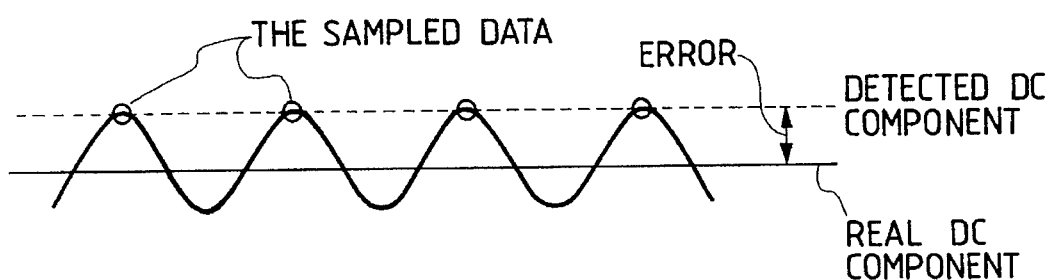
FIG. 20 is an explanatory diagram showing the sampling and its circumstances by a method of sampling color out-of-registration detect patterns.
Figure 21:
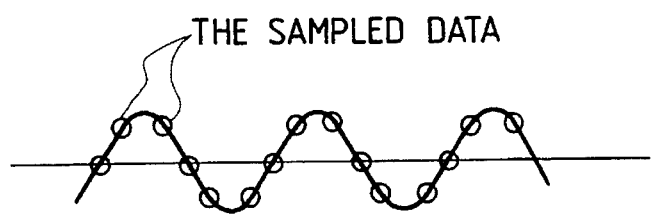
FIG. 21 is an explanatory diagram showing the sampling and its circumstances by a method of sampling color out-of-registration detect patterns.

The sensitivity of the linear CCD 31, which is for detecting the color out-of-registration detect patterns 22a(K), 22a(Y), 22a(M) and 22a(C), and 22b(K), 22b(Y), 22b(M) and 22b(C), varies with the photosensing picture elements, as shown in FIG. 19. Accordingly, when the positions of the color out-of-registration detect patterns 22a(K), 22a(Y), 22a(M) and 22a(C), and 22b(K), 22b(Y), 22b(M) and 22b(C) are detected by the linear CCD 31, the detected positions of those patterns 22a(K), 22a(Y), 22a(M) and 22a(C), and 22b(K), 22b(Y), 22b(M) and 22b(C) inevitably contain errors.

One of the possible ways to prevent the errors in detecting the positions of the color out-of-registration detect patterns 22a(K), 22a(Y), 22a(M) and 22a(C), and 22b(K), 22b(Y), 22b(M) and 22b(C) by the linear CCD 31, is to apply the called shading correction to the output signals of the linear CCD 31. In the shading correction, as shown in FIG. 19, the photosensing picture elements of the CCD sensor 31 are illuminated with light at a fixed light intensity. The signals output from those picture elements are corrected so as to be uniform in value through a correction computing process that is carried out by the pattern position computing means 40.

Figure 8:
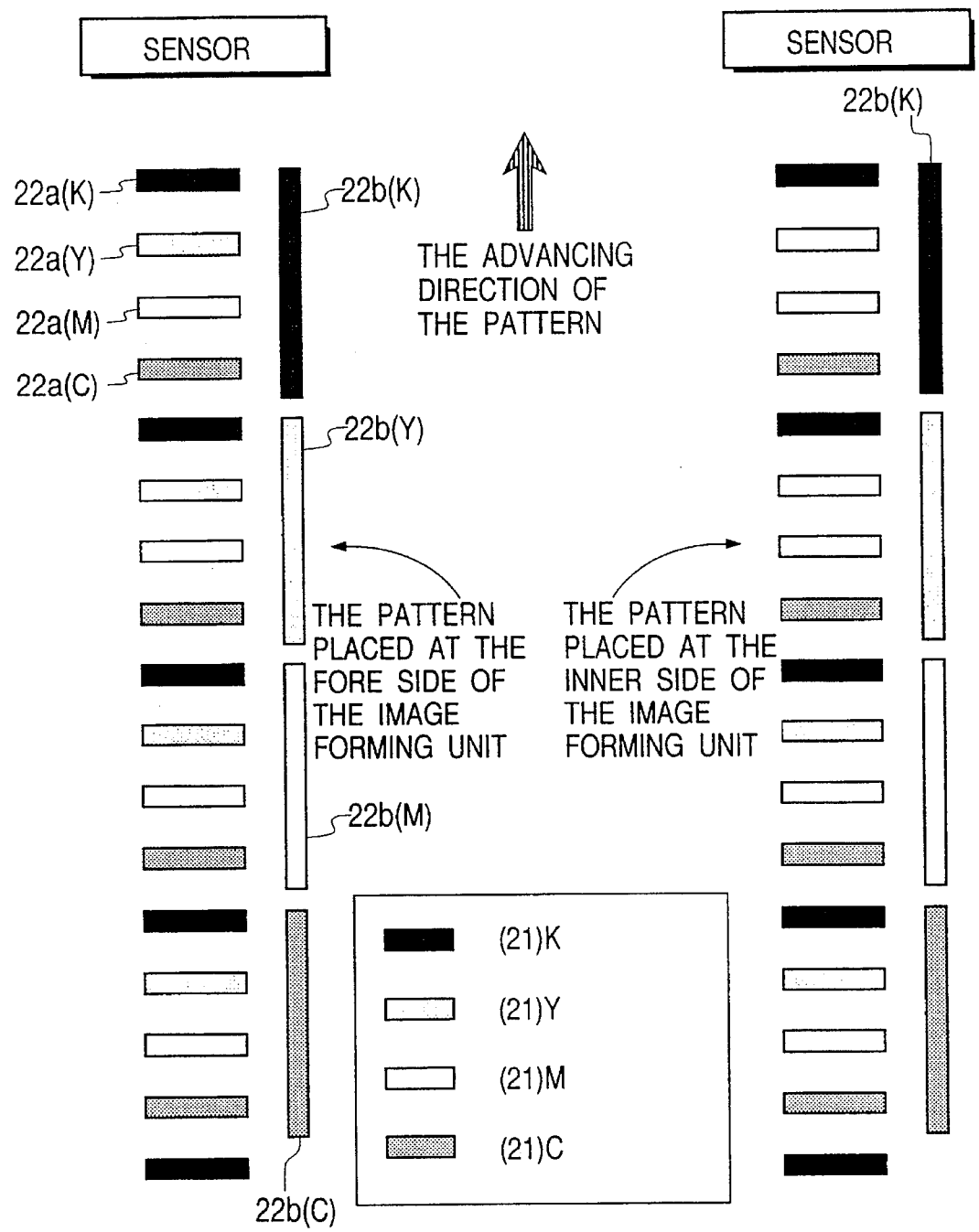
FIG. 8 is an explanatory diagram showing patterns for measuring color out-of-registrations.

The present embodiment is arranged in the following way. In the case of sampling a plural number of the color out-of-registration detect patterns 22a(K), 22a(Y), 22a(M) and 22a(C) arrayed in the direction (fast scan direction) orthogonal to the advancing direction of the endless image-bearing member (slow scan direction), as shown in FIG. 8, the shading correction process for the output signals of the linear CCD 31 is not carried out. In the case of sampling a plural number of the color out-of-registration detect patterns 22b(K), 22b(Y), 22b(M) and 22b(C) arrayed in the advancing direction (slow scan direction) of the endless image-bearing member, the shading correction process for the output signals of the linear CCD 31 is carried out by the pattern position computing means 40.

Figure 13:
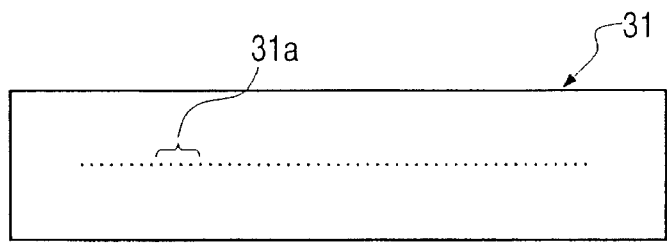
FIG. 13 is a diagram showing a sensor.
Figure 14A:
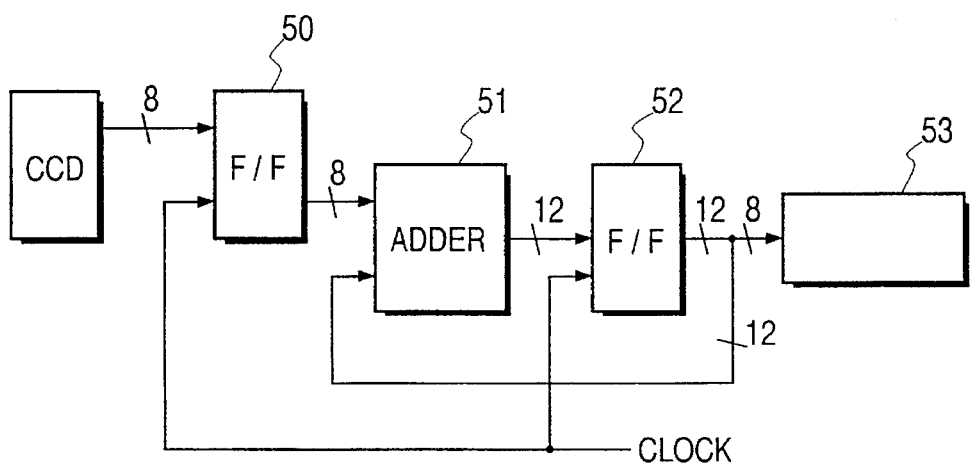
FIGS. 14(a) and 14(b) are block diagrams showing a circuit for carrying out an averaging process.
Figure 14B:
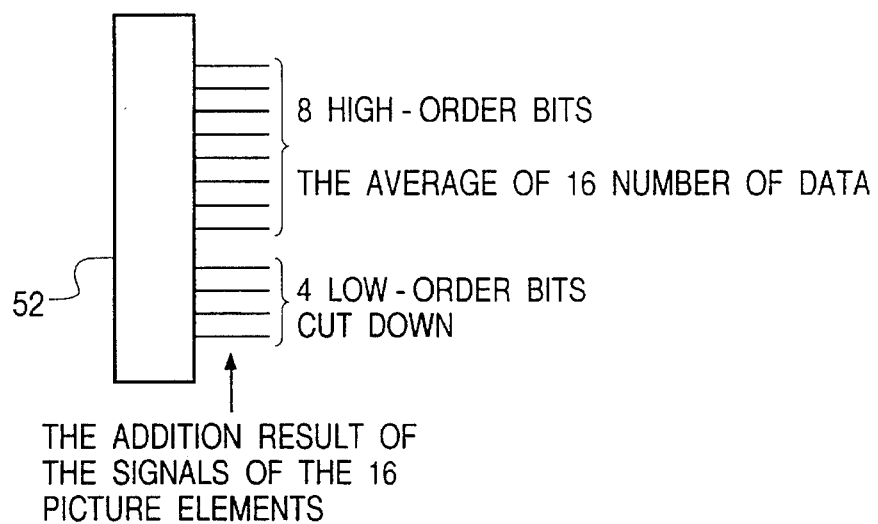

The present embodiment is also arranged in the following way. In the case of sampling a plural number of the color out-of-registration detect patterns 22a(K), 22a(Y), 22a(M) and 22a(C) arrayed in the direction (fast scan direction) orthogonal to the advancing direction of the endless image-bearing member (slow scan direction), only the output signals from sixteen number of specific picture elements 31a of the linear CCD 31 are sampled, as shown in FIG. 13. The output signals of the specific picture elements 31a are further averaged into detect data. Accordingly, the output signals of the specific picture elements 31a of the linear CCD 31, as shown in FIG. 14, are only those of sixteen number of the picture elements that are output as serial signals of 8 bits from the linear CCD 31. The sixteen number of serial signals, outputted from the linear CCD 31, are latched in a first flip-flop 50, and are applied to an adder 51. The adder 51 successively adds the received serial signals to the addition result of the previous addition that is outputted from a second flip-flop 52. The addition result is latched as 12-bit data in the second flip-flop 52 till the addition process for all of the sixteen serial signals outputted from the linear CCD 31 is completed. An averaging process of the sixteen serial signals outputted from the linear CCD 31 is carried out by the hardware by using only the 8 high-order bits of the sixteen serial signals latched as the addition results in the second flip-flop 52. In the case of the data expressed in terms of binary system, the operation of ½ can be carried out by shifting down one bit the binary data. The operation of ¹⁄₁₆ can be carried out in a manner that 12-bit data is shifted down 4 bits, and only the 8 high-order bits are used. Accordingly, 16 number of data processed by the adder 51 can be averaged. The signals of 16 picture elements outputted from the linear CCD 31 are stored in an image memory 53.

In the color image forming apparatus, the number of the specific picture elements of the line photosensing device is the N-th power of 2.

Also in the color image forming apparatus, the output signals of the specific picture elements of the N-th power of 2 are averaged by using only the hardware, and the resultant data is sampled.

With such a construction, in the color image forming apparatus which incorporates the color out-of-registration detect patterns sampling method of the present embodiment, the sampling of the color out-of-registration detect patterns is carried out in the following way. In a digital color copying machine into which the color out-of-registration detect patterns sampling method is incorporated, a variation of temperature within the machine and/or application of an external force to the machine possibly causes the positions and the size of the image forming units 21K, 21Y, 21M and 21C, and the component parts of these units to displace. The temperature variation and the application of the external force inevitably take place. In ordinary works for the copying machine, such as removal of paper jamming, parts exchange in maintenance, or movement of the digital color copying machine, an external force is inevitably applied to the copying machine. Under the temperature variation within the machine and the external force applied, the positioning of the color images formed by the image forming units 21K, 21Y, 21M and 21C is not exact, resulting in color out-of-registration. This makes it difficult to keep high picture quality. For this reason, in the digital color copying machine into which the color out-of-registration detect patterns sampling method is incorporated, a correction mode based on the results of sampling color out-of-registration detect patterns is executed at the time of turning on the power switch of the copying machine, after removal of the paper jamming, at other proper timings, before an ordinary image forming mode (print mode), during an ordinary image forming mode (print mode), and the like.

In the correction mode based on the results of sampling color out-of-registration detect patterns, as shown in FIG. 3, commands are issued for transfer to the related portions by the control board 28, and the interface boards 25K, 25Y, 25M and 25C start to successively output the image data of the color out-of-registration detect patterns to the corresponding image forming units 21K, 21Y, 21M and 21C by a color out-of-registration detect patterns output means contained therein. At this time, the timing of the outputting of the image data by the interface boards 25K, 25Y, 25M and 25C output the image data is exactly the same as the timing of the normal image forming mode (print mode). With this, the image forming units 21K, 21Y, 21M and 21C form predetermined image-position detect pattern image 22 on the basis of the image data, and successively transfer the patterns on the image transfer/transport belt 8 in a superimposed manner at the same timings as those in the normal image forming mode (print mode). In this way, the color out-of-registration detect patterns 22 are formed on the transfer/transport belt 8.

The color out-of-registration detect patterns 22, as shown in FIG. 8, include color out-of-registration detect patterns 22b(K), 22b(Y), 22b(M) and 22b(C) arrayed in the fast scan direction orthogonal to the advancing direction of the transfer/transport belt 8, and color out-of-registration detect patterns 22a(K), 22a(Y), 22a(M) and 22a(C) arrayed in the slow scan direction as the advancing direction of the transfer/transport belt 8. A set of the color out-of-registration detect patterns 22b(K), 22b(Y), 22b(M) and 22b(C), and 22a(K), 22a(Y), 22a(M) and 22a(C) and another set of these patterns are transferred, in a superimposed manner, onto such portions on the belt as to allow the pattern detecting means 20, which are placed at the fore side and the inner side of the image forming unit, to read the patterns. As for the color out-of-registration detect patterns 22a(K), 22a(Y), 22a(M) and 22a(C), and 22b(K), 22b(Y), 22b(M) and 22b(C) arrayed in the fast and slow scan directions, strip patterns as straight portions of the colors, black (K), yellow (Y), magenta (M), and cyan (C) are successively arranged at proper spaces thereamong.

Figure 9:
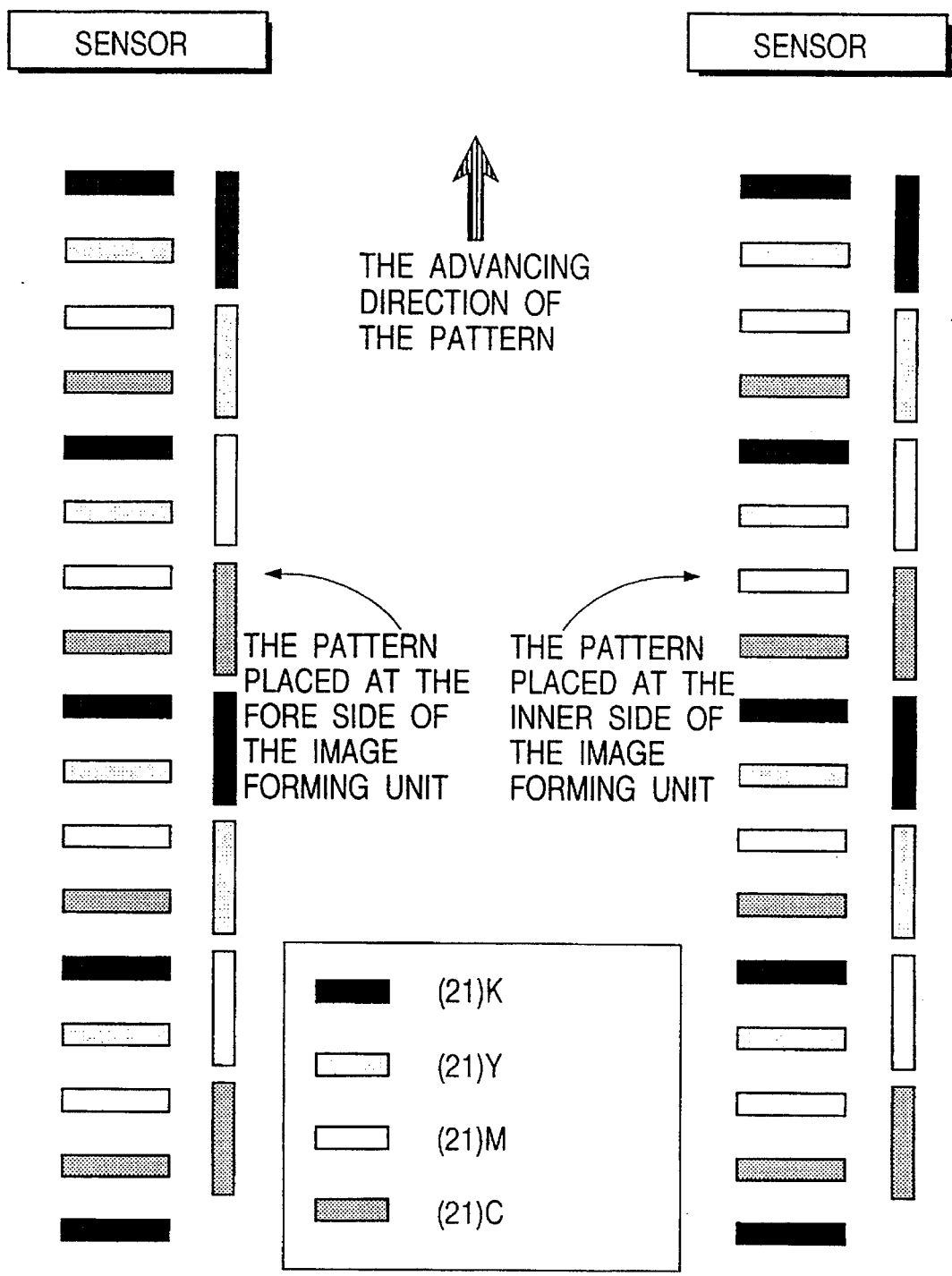
FIG. 9 is another explanatory diagram showing patterns for measuring color out-of-registrations.
Figure 10:
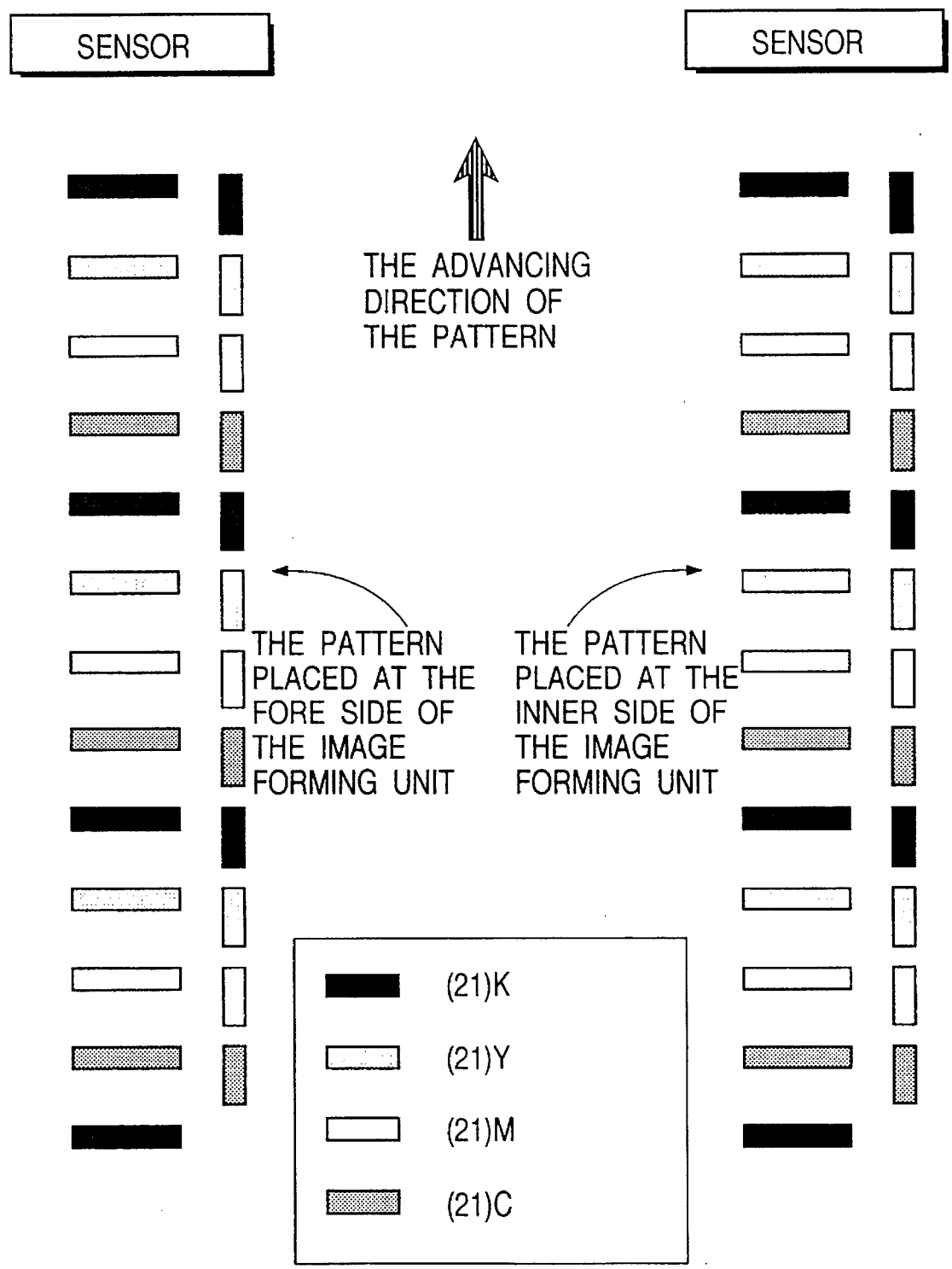
FIG. 10 is yet another explanatory diagram showing patterns for measuring color out-of-registrations.
Figure 11:
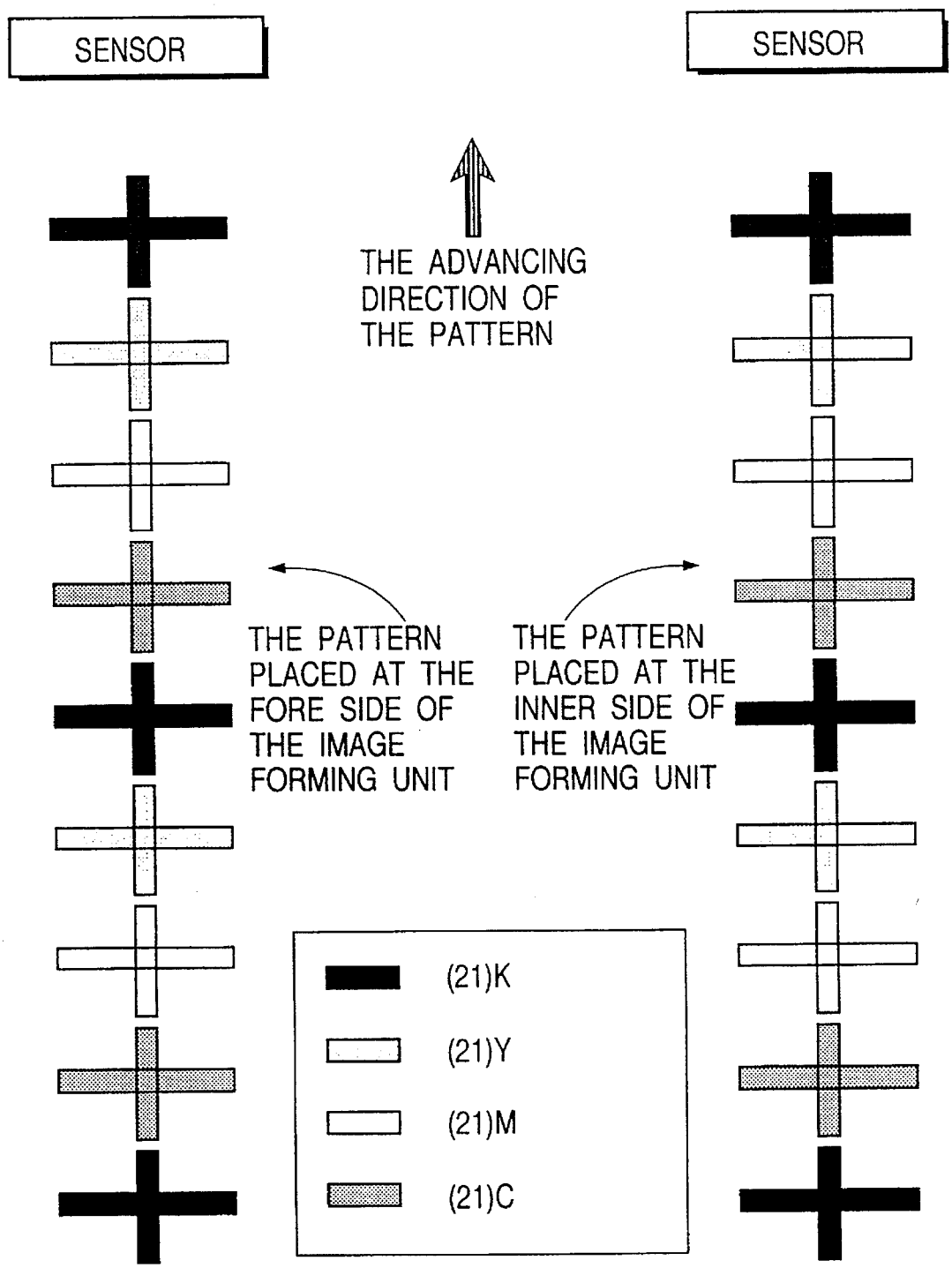
FIG. 11 is still another explanatory diagram showing patterns for measuring color out-of-registrations.

Additional color out-of-registration detect patterns 22 are illustrated in FIGS. 9 to 11. These color out-of-registration detect patterns 22 are arranged such that the straight portions thereof parallel to the slow can direction and those parallel to the fast scan direction successively reach the color image read areas of the pattern detecting means 20. These color out-of-registration detect patterns 22 have the following two advantages:

1) Since the width of each of the patterns located on the this side and the inner side, when seen in the slow scan direction, is narrow, there is no need of using a long sensor.

2) Since the patterns of those colors are disposed not superimposed, it is possible to know what color pattern is being read, not using a color sensor. In the color out-of-registration detect patterns illustrated in FIGS. 8 to 11, black (K) is used as the reference color. In addition to those color out-of-registration detect patterns 22, another type of color out-of-registration detect patterns may be used as a matter of course. In this type of the patterns, color out-of-registration detect patterns arrayed in the direction substantially parallel to the advancing direction of the transfer/transport belt 8 and in the direction substantially orthogonal to the advancing direction, are slanted to each other, to thereby form V-shaped color out-of-registration detect patterns.

The correction board 26 monitors the times when the interface boards 25K, 25Y, 25M and 25C start to successively output the image data of the color out-of-registration detect patterns to the image forming units 21K, 21Y, 21M and 21C, and predicts time when each of the color out-of-registration detect patterns 22 reaches right under the pattern detecting means 20, on the basis of the timings computed. The computating operation for these predicted times is carried out by the leading-edge arrival time computing means 44 for computing the arrival time of the leading edges of the color out-of-registration detect patterns 22 of the respective colors. At the predicted time, the correction board 26 refers to the sampling data gathered when the pattern detecting means 20 is driven by the sensor board 32 and samples the color out-of-registration detect patterns 22, and drives the pattern position computing means 40, contained in the correction board 26, which in turn computes the sampling data, to thereby produce the positions of the individual color out-of-registration detect patterns 22 in a successive manner. As described above, the arrival times of the individual color out-of-registration detect patterns 22 at the location right under the pattern detecting means 20 are computed for prediction, and the color out-of-registration detect patterns 22 are read by the pattern detecting means 20. This is done for preventing the missing of the read of the color out-of-registration detect patterns 22.

The sampling data which drives the pattern position computing means 40 has a profile shown in FIGS. 12 and 13, for example, and contains information representative of a variation of the amount of light caused when these color out-of-registration detect patterns 22 pass under the pattern detecting means 20. The pattern position computing means 40, as shown in FIG. 12, computes the centroid position or the center position of the variation of the light amount using the sampling data thus profiled, and stores the computed pattern positions in the pattern position memories 45K, 45Y, 45M and 45C, which are provided for those colors. The correction board 26 repeats this operation till the computed value count means 41 contained in the correction board 26 counts the number of computating operations for each color, a preset number n (e.g., 4) of counts (n+1 for the reference color in the slow scan direction) is reached, and the computed value count means 41 issues an instruction to end the read operation of the color out-of-registration detect patterns 22. The interval of the pattern position computating operation is determined by the timing signals that are generated by the computating-operation timing generating means 42 contained in the correction board 26. By adjusting the interval of the pattern position operation and the distances of the color out-of-registration detect patterns 22, the interface boards 25K, 25Y, 25M and 25C output, in advance, image data to the image forming units 21K, 21Y, 21M and 21C.

When the color out-of-registration detect patterns $22a(K)$, $22a(Y)$, $22a(M)$ and $22a(C)$, and $22b(K)$, $22b(Y)$, $22b(M)$ and $22b(C)$ as shown in FIG. 8 are detected by the linear CCD 31 forming the pattern detecting means 20, if the positions of those patterns detected by the linear CCD 31 are directly used, the detected positions of those patterns $22a(K)$, $22a(Y)$, $22a(M)$ and $22a(C)$, and $22b(K)$, $22b(Y)$, $22b(M)$ and $22b(C)$ inevitably contain errors since the sensitivity of the linear CCD 31 varies with the photosensing picture elements as shown in FIG. 19.

To cope with this, the present embodiment is arranged in the following way. In the case of sampling a plural number of the color out-of-registration detect patterns $22a(K)$, $22a(Y)$, $22a(M)$ and $22a(C)$ arrayed in the direction orthogonal to the advancing direction of the transfer/transport belt 8, the shading correction process for the output signals of the linear CCD 31 is not carried out. In the case of sampling a plural number of the color out-of-registration detect patterns $22b(K)$, $22b(Y)$, $22b(M)$ and $22b(C)$ arrayed in the advancing direction of the endless image-bearing member, the shading correction process for the output signals of the linear CCD 31 is carried out.

The shading correction when the color out-of-registration detect patterns $22a(K)$, $22a(Y)$, $22a(M)$ and $22a(C)$ arrayed in the advancing direction of the transfer/transport belt 8 are sampled, is carried out by the pattern position computing means 40, as shown in FIG. 12.

When the color out-of-registration detect patterns $22a(K)$, $22a(Y)$, $22a(M)$ and $22a(C)$ arrayed in the direction orthogonal to the advancing direction of the transfer/transport belt 8, are sampled, the shading correction process is not carried out as described above. In this case, the data representative of sixteen specific picture elements, that are outputted from the linear CCD 31, are averaged by the averaging circuit shown in FIG. 14, whereby sampling the detection data of the color out-of-registration detect patterns $22a(K)$, $22a(Y)$, $22a(M)$ and $22a(C)$.

The color out-of-registration computing means 43, contained in the correction board 26, computes quantities of color out-of-registrations using the positions of the color out-of-registration detect patterns thus computed, and then performs a predetermined operation of these quantities, to thereby provide accurate color out-of-registrations. The predetermined operation may be the operation for simple mean, the operation for obtaining a median between the maximum value and the minimum value, the operation for obtaining a value where the greatest number of color out-of-registrations are distributed, or the like. Abnormal data (improper to the computating operation of the color out-of-registration) is removed on the basis of the result of judging a distribution of the color out-of-registrations and their transition. Then, a predetermined operation is performed for the resultant data, thereby providing accurate color out-of-registrations.

The correction board 26 receives difference values of the color out-of-registration detect pattern positions that are computed by the color out-of-registration computing means 43, converts them into correction values for correcting the image forming units by an image forming unit correction value computing means contained therein, and outputs and sets the results to and in the image forming units 21K, 21Y, 21M and 21C. The operation of writing the color out-of-registration patterns and of detecting the quantities of the color out-of-registrations are performed again. The conversion to the correction values for correcting the image forming units is carried out on the basis of the second detected quantities of the color out-of-registrations by the correction value computing means 46, and the corrections values are outputted to and set in the image forming units 21K, 21Y, 21M and 21C. And the color out-of-registration correction mode ends.

As described above, in the present embodiment, in the case of sampling a plural number of the color out-of-registration detect patterns $22a(K)$, $22a(Y)$, $22a(M)$ and $22a(C)$ arrayed in the direction orthogonal to the advancing direction of the transfer/transport belt 8, the shading correction process for the output signals of the linear CCD 31 is not carried out. In the case of sampling a plural number of the color out-of-registration detect patterns $22b(K)$, $22b(Y)$, $22b(M)$ and $22b(C)$ arrayed in the advancing direction of the transfer/transport belt 8, the shading correction process for the output signals of the linear CCD 31 is carried out by the pattern position computing means 40. Accordingly, when the plural number of the color out-of-registration detect patterns $22a(K)$, $22a(Y)$, $22a(M)$ and $22a(C)$ arrayed in the direction substantially orthogonal to the advancing direction of the transfer/transport belt 8, are sampled, the shading correction process for the output signals of the line photosensing device is not carried out. Therefore, the sampling period of the color out-of-registration detect patterns $22a(K)$, $22a(Y)$, $22a(M)$ and $22a(C)$ arrayed in the direction substantially orthogonal to the advancing direction of the transfer/transport belt 8 may be reduced without greatly increasing the hardware and software construction, and the cost to manufacture. The color out-of-registration detect patterns $22a(K)$, $22a(Y)$, $22a(M)$ and $22a(C)$ are accurately sampled. Thus, there is provided a method of sampling the color out-of-registration detect patterns in a color image forming apparatus, which is improved in the accuracy of detecting the color out-of-registration, such as DC component.

When the color out-of-registration detect patterns $22a(K)$, $22a(Y)$, $22a(M)$ and $22a(C)$ arrayed in the direction substantially orthogonal to the advancing direction of the transfer/transport belt 8, the resultant detection profile varies with the sensitivities of the individual picture elements of the linear CCD 31 if the shading correction is not executed. Nevertheless, the centroid and the peak positions of the detection profile do not vary with the sensitivities of the individual picture elements of the linear CCD 31. Therefore, in detecting the former patterns, or the color out-of-registration detect patterns $22a(K)$, $22a(Y)$, $22a(M)$ and $22a(C)$ arrayed in the direction (fast scan direction) substantially orthogonal to the advancing direction of the transfer/transport belt 8, the detection accuracy is little deteriorated if the shading correction is not carried out.

The present invention is constructed and operated as described above. Accordingly, the present invention succeeds in providing a color image forming apparatus which forms, for color image formation, a plural number of toner images of different colors on an image transfer member placed on the endless image-bearing member or directly on the endless image-bearing member, the apparatus being capable of accurately sampling the color out-of-registration detect patterns without greatly increasing the hardware and software construction, and improving the accuracy of correcting the color out-of-registration.

What is claimed is:

1. A color image forming apparatus, comprising:

an endless image bearing member driven for turn, an image transfer member placed on said endless image bearing member, a photosensing device with a number of photosensing picture elements linearly arrayed, and a controlling means for sampling the color out-of-registration detect patterns in order to control out-of-registrations of toner images of different colors formed on said image transfer member or directly formed on said endless image bearing member in a manner that said color out-of-registration detect patterns being arrayed at preset distances in the directions substantially parallel to the advancing direction of said endless image bearing member and substantially orthogonal to the advancing direction of said endless image bearing member, to form a plural number of toner images of different colors on said image transfer member placed on said endless image bearing member or directly on said endless image bearing member, wherein said control means controlling in a manner that the output signals of said line photosensing device are prohibited from the shading correction, when a plural number of color out-of-registration detect patterns arrayed in the direction substantially orthogonal to the advancing direction of said endless image bearing member are sampled; and the output signals of said line photosensing device are performed in the shading correction, when a plural number of color out-of-registration detect patterns arrayed in the direction substantially parallel to the advancing direction of said endless image bearing member are sampled.

2. The color image forming apparatus according to claim 1, wherein only the output signals of specific picture elements in said line photosensing device are sampled, when the plural number of color out-of-registration detect patterns arrayed in the direction substantially orthogonal to the advancing direction of said endless image bearing member are sampled.

3. The color image forming apparatus according to claim 2, wherein the number of the specific picture elements of said line photosensing device is the N-th power of 2.

4. The color image forming apparatus according to claim 3, in which the output signals of said specific picture elements of the N-th power of 2 averaged by using only a hardware is sampled.

5. The color image forming apparatus according to claim 1, wherein said endless image bearing member is selected from a group of an image transfer belt, a image transfer drum with a synthetic resin film put thereon, a medium transfer member shaped like a belt, and a photoreceptor shaped like a belt.

6. The color image forming apparatus according to claim 1, wherein said photosensing device is selected from a group of transmission-type, and reflection-type.

7. The color image forming apparatus according to claim 6, wherein said photosensing device is a line CCD.

8. A color image forming apparatus comprising:

an endless image bearing member driven for turn;

a plural number of image forming units disposed in opposition to said endless image bearing member;

means for forming on said endless image bearing member first and second color out-of-registration detect patterns each of a predetermined length arrayed in the turn direction of said endless image bearing member, in order to control the timings of the image forming operations by said image forming units;

a line photosensing device, comprising a plural number of photosensing elements, for detecting said color out-of-registration detect patterns, said line photosensing device being disposed in opposition to said endless image bearing member, said plural number of photosensing elements being arrayed in the lengthwise directions of said first and second color out-of-registration detect patterns;

timing control means for controlling the image forming timings of said image forming units based on said color out-of-registration detect patterns detected by said line photosensing device; and shading correcting means for shading correcting the output signals of said photosensing elements only when either of said first and second color out-of-registration detect patterns is detected by said line photosensing device.

9. The color image forming apparatus according to claim 8, wherein said shading correcting means performs the shading correction only when said first or second color out-of-registration detect patterns of which the lengthwise direction is coincident with the direction of the array of photosensing elements, are detected.

* * * * *